Nov. 6, 1923.

M. RIKER 1,473,383

MEANS FOR HALVING EGGS AND SLICING FRUITS

Filed Aug. 24, 1921

*INVENTOR:*
Monro Riker,
BY
Fraenkel and Richards,
ATTORNEYS.

Patented Nov. 6, 1923.

1,473,383

UNITED STATES PATENT OFFICE.

MONRO RIKER, OF CHESTER, NEW JERSEY.

MEANS FOR HALVING EGGS AND SLICING FRUITS.

Application filed August 24, 1921. Serial No. 494,773.

*To all whom it may concern:*

Be it known that I, MONRO RIKER, a citizen of the United States, residing at Chester, in the county of Morris and State of New Jersey, have invented certain new and useful Improvements in Means for Halving Eggs and Slicing Fruits; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

This invention has reference, generally, to improvements in household articles; and, the present invention relates, more particularly, to a novel, as well as to an ornamental device which is readily adapted for use as a means for cutting or halving boiled eggs, but which is just as readily usable as a cutting or severing means for the slicing of fruits, such as oranges, lemons, apples and the like.

The present invention has for its principal objects to provide a simply constructed, ornate, and cheaply manufactured device, for the purposes of severing or halving boiled eggs, or the slicing of fruits, which may be readily used upon the table, and may be provided upon either side of the cutter or severing member with which the device is provided, with dished receiving portions providing receivers for catching any spilled portions of the egg, when soft boiled, or for catching the juices of the fruit when being sliced.

Other objects of the present invention not at this time more particularly enumerated will be clearly understood from the following detailed description of the present invention.

With the various objects of the present invention in view, the said invention consists, primarily, in the novel house-hold table-article for use as means of severing or halving boiled eggs, or for slicing fruits, as will be hereinafter more fully set forth; and, the said invention consists, furthermore, in the novel arrangements and combinations of the several parts of the device, all of which will be more fully described in the following specification and then finally embodied in the clauses of the claims which are appended to the said specification, and which form an essential part of the same.

The invention is clearly illustrated in the accompanying drawings, in which:—

Similar characters of reference are employed in the said above described views, to indicate corresponding parts.

Referring now to the several figures of the drawings, the reference-character 1 indicates a complete device, made according to and embodying the principles of the present invention, the same comprising a suitable base or support, as 2, made of metal or any other desirable material, and which may be of any suitable marginal configuration, either rectangular, as here shown in the accompanying drawings, or otherwise.

Figure 1:
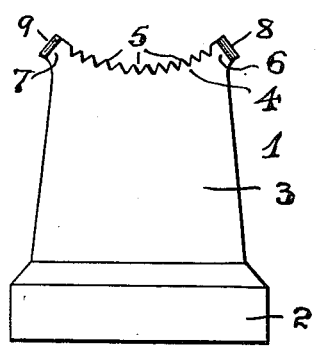
Figure 1 is a front elevation, and Figure 2 a side elevation of an egg or fruit severing or slicing device, showing one embodiment of the principles of the present invention.
Figure 2:
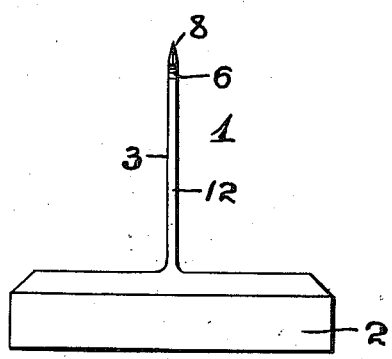
Figure 3:
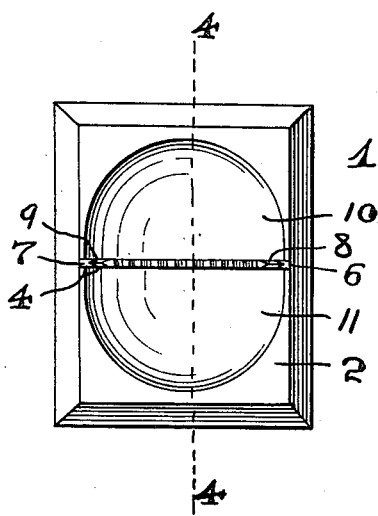
Figure 3 is a top or plan view of the device.
Figure 4:
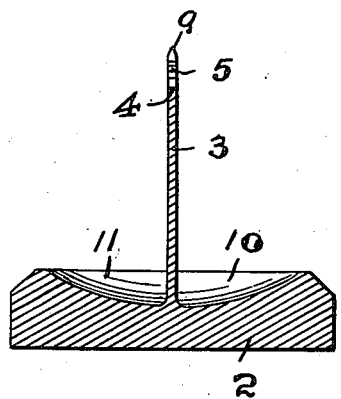
Figure 4 is a vertical sectional representation of the same, said section being taken on line 4—4 in said Figure 3.

Extending transversely and upwardly from the upper surface of the said base 2 is a dividing element or member 3, preferably of the marginal configuration shown in said Figure 1 of the drawing, and its upper concavely formed portion 4 being made with a multiplicity of fine severing or cutting serrations or saw-teeth, as 5, to provide a suitable cutter, as will be understood. At the respective end-portions of the cutter thus provided, the dividing element or member 3 may be formed with slightly outwardly projecting edge-members, as 6 and 7, which are suitably sharpened so as to provide a pair of cutters or knife-edges 8 and 9. If desired, at either side of the dividing element or member 3, the base 2 of the device may be made dish-shaped, as at 10 and 11, for the purpose herein-before stated.

In using the device, the same is placed upon the table with one of the edges 12 of the dividing element or member 3 facing the person seated at the table.

When a boiled egg is to be severed or halved, the egg is held in both hands, and slightly forced down over the severing or cutting serrations or saw-teeth 5, thereby suitably breaking through the shell of the egg. The egg is thereupon rotated upon the severing or cutting serrations of the dividing element or member 3, until entirely and readily cut in two parts, any undue soft portions of the egg running down the sides of the element or member 3 and being collected in the concave or dish-shaped receptacle portions 10 and 11, without any danger of soiling the fingers, or of spotting the table-cloth.

In a like manner, fruits as oranges, lemons, applies, and the like, can be suitably sliced, by rotatably moving the fruit over the cutting or severing serrations 5, the cutters or knife-edges 8 and 9 serving to cut into and through the skin of the fruit, so as to avoid ragged and unsightly edges of the sliced portions of the fruit, as will be clearly evident.

Of course I am aware that some changes may be made in the general combination and conformations of the several parts of the device, without departing from the scope of the present invention as set forth in the foregoing specification, and as defined in the clauses of the claims which are appended thereto. Hence, I do not limit myself to the exact details of the construction and conformation of the several parts of the devices as described in the said specification, and as illustrated in the accompanying drawings.

I claim:—

1. An egg or fruit severing or slicing device, comprising a base, and a transverse and centrally disposed cutting members projecting upwardly at a right angle to said base, said member being provided upon its upper edge with severing serrations or saw-teeth, the base of the device being further provided in its upper surface at either side of said transversely and upwardly extending member with dish-shaped receiving portions.

2. An egg or fruit severing or slicing device, comprising a base, and a transverse and centrally disposed cutting member projecting upwardly at a right angle to said base, said member being provided upon its upper edge with severing serrations or saw-teeth, and at the ends of said severing serrations or saw-teeth with outwardly projecting elements formed with knife-edges, the base of the device being further provided in its upper surface at either side of said transversely and upwardly extending member with dish-shaped receiving portions.

3. An egg or fruit severing or slicing device, comprising a base, and a transverse and centrally disposed cutting member projecting upwardly at a right angle to said base, said member having an upper concave edge-portion provided with severing serrations or saw-teeth, the base of the device being further provided in its upper surface at either side of said transversely and upwardly extending member with dish-shaped receiving portions.

4. An egg or fruit severing or slicing device, comprising a base, and a transverse and centrally disposed cutting member projecting upwardly at a right angle to said base, said member having an upper concave edge-portion provided with severing serrations or saw-teeth, and at the ends of said severing serrations or saw-teeth with outwardly projecting elements formed with knife-edges, the base of the device being further provided in its upper surface at either side of said transversely and upwardly extending member with dish-shaped receiving portions.

In testimony, that I claim the invention set forth above I have hereunto set hand this 12th day of August, 1921.

MONRO RIKER.

Witnesses:
 SAMUEL W. RIKER,
 ALONZO P. GREEN.